(12) United States Patent
Schulz et al.

(10) Patent No.: US 11,822,549 B2
(45) Date of Patent: Nov. 21, 2023

(54) HISTOGRAM WITH INTEGRATED DISTINCT VALUE SKETCHES

(71) Applicant: SAP SE, Walldorf (DE)

(72) Inventors: Siomara Schulz, Walldorf (DE); Guido Moerkotte, Walldorf (DE); Norman May, Walldorf (DE)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 17/472,839

(22) Filed: Sep. 13, 2021

(65) Prior Publication Data

US 2023/0087753 A1    Mar. 23, 2023

(51) Int. Cl.
| | |
|---|---|
| *G06F 16/00* | (2019.01) |
| *G06F 16/2453* | (2019.01) |
| *G06F 16/2455* | (2019.01) |
| *G06F 16/26* | (2019.01) |
| *G06F 16/248* | (2019.01) |
| *G06F 16/23* | (2019.01) |

(52) U.S. Cl.
CPC .... *G06F 16/24545* (2019.01); *G06F 16/2365* (2019.01); *G06F 16/248* (2019.01); *G06F 16/2455* (2019.01); *G06F 16/26* (2019.01)

(58) Field of Classification Search
CPC ............... G06F 16/24545; G06F 16/26; G06F 16/2455; G06F 16/2365; G06F 16/248
USPC .................................................. 707/600–899
See application file for complete search history.

(56) References Cited

U.S. PATENT DOCUMENTS

| | | | | |
|---|---|---|---|---|
| 7,707,005 | B2* | 4/2010 | Fraser | G06F 17/18 |
| | | | | 702/182 |
| 10,853,368 | B2* | 12/2020 | Behm | G06F 16/24545 |
| 2014/0114950 | A1* | 4/2014 | Halverson | G06F 16/24554 |
| | | | | 707/E17.131 |
| 2015/0149508 | A1* | 5/2015 | Luo | G06F 16/21 |
| | | | | 707/802 |
| 2016/0110426 | A1* | 4/2016 | Gaza | G06F 16/23 |
| | | | | 707/768 |
| 2018/0336252 | A1* | 11/2018 | Joshi | G06F 21/6245 |
| 2019/0384830 | A1* | 12/2019 | Nazi | G06F 17/18 |
| 2020/0257684 | A1* | 8/2020 | Erlandson | G06F 16/2255 |

* cited by examiner

*Primary Examiner* — Michelle N Owyang
(74) *Attorney, Agent, or Firm* — Buckley, Maschoff & Talwalkar LLC (57) ABSTRACT

Provided are systems and methods for creating histograms with distinct value sketches integrated therein and for query processing based on the histograms with distinct value sketches. In one example, the method may include storing a histogram that comprises a representation of a bucket of data from a database and that includes a distinct value sketch with a distinct value attribute that identifies an estimated number of distinct values within the bucket of data, receiving a database query, generating a query execution plan for the database query based on the distinct value attribute of the bucket within the distinct value sketch embedded within the histogram, and executing the database query on the bucket of data from the database based on the generated query execution plan.

20 Claims, 8 Drawing Sheets

Query Data 310

312

| A | B |
|---|---|
| 1 | 1 |
| 2 | 2 |
| 3 | 3 |
| 3 | 4 |
| 4 | 5 |
| 4 | 6 |
| 4 | 6 |
| 4 | 7 |
| 4 | 8 |
| 4 | 9 |

314

316

HLL Sketches 340

Bucket 0
Bucket boundaries: [1, 4]  342
Number of Tuples: 10  346
344  Number of Distinct Projection Attribute Values: 9

HISTOGRAM WITH INTEGRATED DISTINCT VALUE SKETCHES

BACKGROUND

Estimating distinct values occurs frequently within the database systems, for example, in approximate query answering and query plan optimization. Prior techniques focus on a sampling-based approach for distinct value estimation. The sampling-based approach, however, is not accurate at estimating the number of distinct values unless a large portion of the data is examined, which can consume significant resources and time for larger datasets. Sketch-based approaches also exist as an alternative to sampling. In a sketch-based approach, however, the entire data asset must be scanned at once to produce a synopsis for estimation. Sketch-based approaches also struggle when estimating a number of distinct values for a range of values (e.g., multiple columns) of data.

BRIEF DESCRIPTION OF THE DRAWINGS

Features and advantages of the example embodiments, and the manner in which the same are accomplished, will become more readily apparent with reference to the following detailed description while taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a database which constructs histograms that contain distinct value sketches embedded or otherwise integrated therein. Here, the database may embed the distinct value sketches within the histograms. Distinct value sketches track approximate unique counts of identifiers (e.g., values). Meanwhile, histograms are constructed by partitioning the data distribution of a variable/value into buckets. In the example embodiments, any type of histogram and any type of distinct value sketch can be used. Examples of distinct value sketches include HyperLogLog (HLL) sketches, K-Minimum Value (KMV) sketches, Augmented KMV (AKMV) sketches, Bloom filters, and the like. Likewise, any desired type of histogram can be used with the example embodiments such as equi-width, equi-depth, equi-height, v-optimal, multi-dimensional, STHoles, and the like.

For example, each bucket of data within the histogram may have its own respective distinct value sketch that is provided as histogram statics including distinct value attributes of the bucket. Furthermore, each bucket may include a range of values, for example, one or more columns of data from the dataset. By integrating distinct value sketches into a histogram, and performing a distinct value estimation using a distinct value sketch algorithm (e.g., an HLL algorithm, etc.) a more accurate estimation of distinct values can be generated for each bucket of data in the histogram.

When a database query is received, a query optimizer may use the histogram with distinct value sketches therein to generate a more accurate cost estimation and query executing plan for the database query in comparison to a traditional histogram which does not include sketches. Accordingly, more accurate query processing results and more efficient processing time can be realized due to less errors in the distinct value estimation. The histogram described herein may be generated by the database and updated periodically, continuously, etc. thereby ensuring that the histograms and the distinct value sketches therein are up-to-date. In some embodiments, the distinct value sketches may be used to provide an estimate of a number of distinct groups in a Group By statement of a structured query language (SQL) query. But it should be appreciated that the database query described in the example embodiments is not limited to SQL. Other examples of database queries using a Group By statement include an object query language (OQL) query, an XML Query (e.g., XQuery), and the like.

Histograms are often used to partition data into subsets called buckets. Each bucket stores basic information such as bucket boundaries and statistics about the data it contains. There are various ways bucket boundaries can be determined depending on the type of histogram. The statistics and information that the bucket stores may also differ depending on the type. In database system histograms, it is unusual for bucket boundaries to overlap, although it is possible. In general, histograms are used to visualize data sets, to estimate the frequency distribution of certain attributes of a data set, and for the estimation of result sizes, which is known as cardinality estimation. Other applications of histograms are predicate selectivity estimation and approximate query answering. In database systems, histograms are also a widely used data structure for query optimization.

Early histograms, also referred to as trivial histograms, assign all values of the attribute, over which the histogram is constructed, to a single bucket. To estimate the frequency of a value, histograms use the average of the value frequencies in the bucket that contain this value and thus assign the same estimated frequency to all values in a bucket. Because there is only one bucket, trivial histograms use the same estimated frequency for all values. This approach assumes uniform distribution over the attribute domain. In real data sets, however, the uniform distribution assumption rarely holds, leading to large errors in the estimation. Meanwhile, two of the more commonly used histograms today are equi-width and equi-depth histograms, which yield more accurate estimates than the trivial histograms.

In equi-width histograms, there is no overlap of the buckets and bucket boundaries are determined so that the value range or the number of values in each bucket is equal. In a discrete domain {1, 2, 3} and {4, 5, 6} would be equi-width buckets. For continuous domains, the width equality refers to the size of the range, so that, for example, [1, 3) and [3, 5) would be equi-width bucket boundaries. However, equi-width histograms can produce large errors, because, due to uneven distributions, some values in a bucket may be much more frequent than others, making the estimate of the bucket very imprecise. Equi-depth histograms avoid such large errors both in worst case and on average. Equi-depth histograms are constructed by aiming for the sum of frequencies to be the same in each bucket.

In addition to equi-width and equi-depth histograms, there are a variety of more complex histograms. End-biased histograms commonly store the frequencies of some single values in separate buckets, therefore obtaining exact estimates for these values and add the remaining values into a single bucket, approximating their frequency by average. V-optimal or variance optimal histograms, previously called serial histograms, construct buckets by minimizing the weighted variance of actual and estimated frequency within each bucket. Thus grouping frequencies together that are close rather than very different. Self-tuning histograms are biased toward a certain workload of queries. They are mostly used in data warehouse settings, where the data is usually static and accuracy in frequently queried regions is traded of for inaccuracy in other regions.

The example embodiments consider three histogram types. An equi-width histogram as described above and two equi-NoDv (number of data value) histograms which aim for an equal number of distinct projection attribute values in each bucket, similarly to the discussed equi-depth histogram. The common approach for estimating the result size of range queries using histograms adds the number of tuples in the completely contained buckets to the estimated number of qualifying tuples in the partially touched buckets. The number of tuples is usually stored for each bucket. Thus, the number of tuples for completely contained buckets is exact. To estimate the number of tuples matching the query in the partially touched buckets, an easy approach is to multiply the portion of the bucket which overlaps with the query andthe total number of tuples in the bucket:

$$\frac{\text{\# of Distinct Values in the Intersection}}{\text{\# of Distinct Values in the Bucket}} \times \text{\# of Tuples in the Bucket}$$

This is a common, and relatively easy estimate for the number of tuples hit by the query in partially matched buckets.

Meanwhile, HyperLogLog (HLL) is an algorithm that is widely used to determine the number of distinct values in a large data set using only a small amount of memory. Each element in the input data is hashed using a hash function, which produces uniform hash values. The data is then divided into subsets (buckets) using the first b bits of the hash value to determine the subset the value belongs to. This method is called stochastic averaging and reduces the variability that comes from large outliers in the data set. Then the number of leading zeros of the hash value without the b bitsis calculated. For each subset the maximum number of leading zeros, plus one, within this subset, is stored. In this example, the number of distinct values for each subset may be:

$$_2\text{length of longest run of starting 0-bits+1}$$

This approach is referred to as probabilistic counting. The number of subsets is given as $m=2^b$, so the number of subsets and therefore the accuracy can be increased by increasing the number of bits taken from the beginning of the hash value in exchange for more memory usage. The original HLL uses a 32-bit hash function with the leading 5 bits (short byte) of the hash value determining the subset. Another example is a HLL++ algorithm that uses a 64-bit hash function and the leading 8 bits for subset determination. In this example, a bias correction may also be performed leading to overall less estimation errors for large cardinalities. Two HLL sketches with the same number of subsets can be easily merged by taking the maximum of the two values stored for each subset. This may be performed when a range query covers multiple buckets. The distinct value estimates for every bucket that overlaps with the query may be merged to get the estimate.

A number of different estimators have been suggested to estimate the number of distinct values over all subsets. One example suggests the use of a harmonic mean of the subsets to calculate the number of distinct values in all subsets as it performed better than the previously used geometric mean. Other examples suggest an improved estimator based on the Poisson approximation, which performs better on small and large cardinalities as well as intersections, relative complements and unions of two sets represented as HLL sketches. In the example embodiments, the implementation may use a 64-bit MurmurHash3 as hash function, however embodiments are not limited thereto. The data may be divided into 64 subsets with the leading b=8 bits of the hash value determining the subset. Furthermore, an improved estimator based on the Poisson approximation may be used to estimate the number of distinct values for multiple subsets, but embodiments are not limited thereto.

Histograms often include a graphic representation which is created by the database and stored in a histogram database object. The graphic representation may include a chart(s) or a graph(s) which visualizes a range of data of the database. When a structured query language (SQL) query (or a query in another query language) is received, a query optimizer of the database may consult the histogram associated with the data to be queried and generate a query execution plan based on the data included in the histogram. The visual representation of the histogram may include various visualizations such as bars, or other shapes that are arranged on a two-dimensional graph. The visual representation may include various attributes of the data such as boundaries of each bucket, number of distinct values in each bucket, size of each bucket (e.g., total number of tuples/data elements in the bucket), and the like.

Figure 1A:
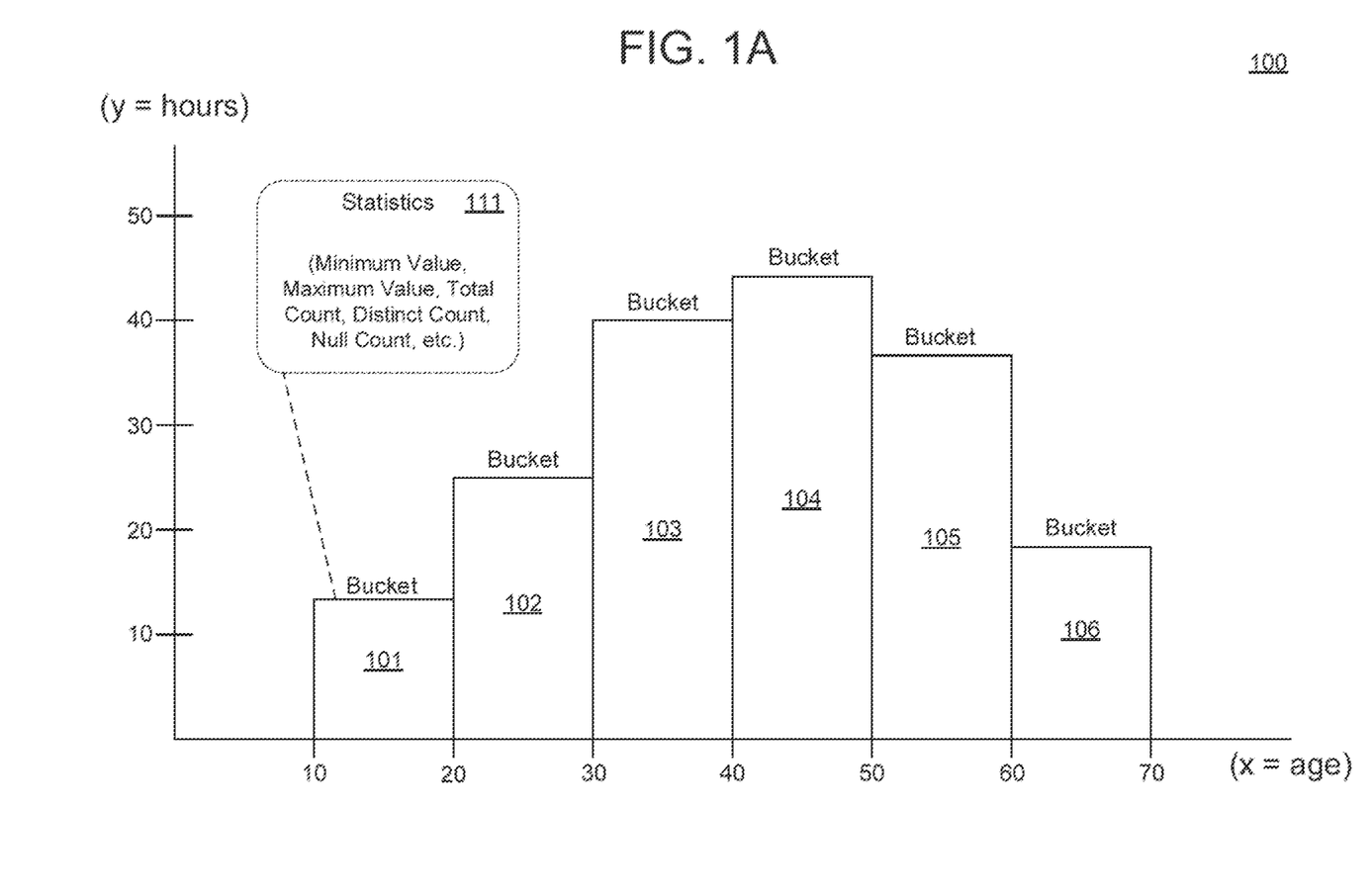
FIG. 1A is a diagram illustrating an example of a graphic representation of a histogram, in accordance with an example embodiment.
Figure 1B:
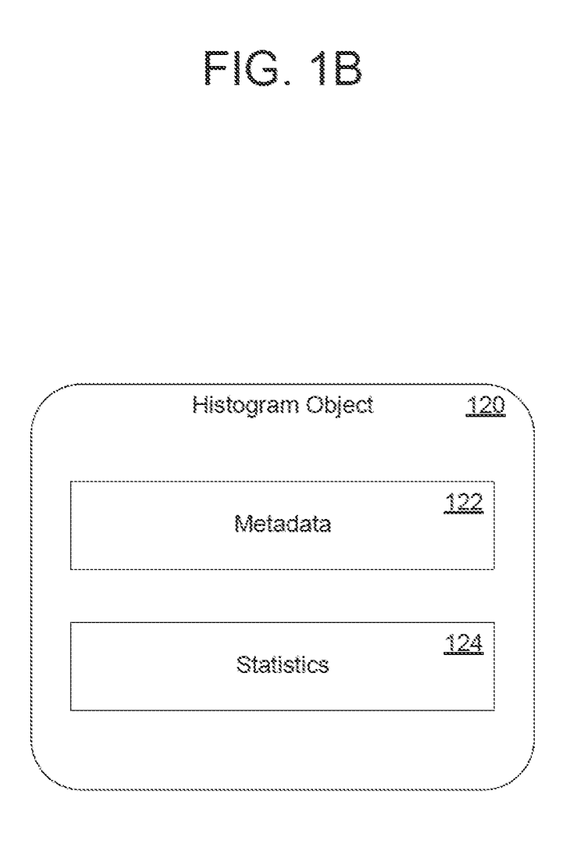
FIG. 1B is a diagram illustrating an example of a histogram object that includes statistics, in accordance with an example embodiment.

FIG. 1A illustrates an example of a graphic representation 100 of a histogram, in accordance with an example embodiment, and FIG. 1B illustrates an example of a histogram object 120 that includes statistics as well as a graphic representation, in accordance with an example embodiment. Referring to FIG. 1A, the graphic representation 100 includes a bar chart with a plurality of buckets of data 101, 102, 103, 104, 105, and 106. In this example, the buckets of data refer to two different data attributes including "age" of a person that is represented by the X axis and "average number of hours worked" by a person represented on the Y axis. Each of the buckets include bucket boundaries identifying where each bucket starts/stops on the X axis. In this case, the buckets are non-overlapping and equi-width. However, the number of tuples/ data elements in each bucket differs. Each bucket may also include statistics 111 such as a minimum value, a maximum value, a total count, a distinct count, a null count, and the like.

Referring now to FIG. 1B, a histogram object 120 stored by the database includes metadata 122 such as a number of buckets of the histogram, a data type of the values in each bucket, and the like. The histogram object 120 may also include statistics 124 (such as the statistic 111 shown in FIG. 1A). Although not required, the histogram object may include the graphic representation (e.g., the graph shown in FIG. 1A), but the graphic representation is not necessary. The histogram object 120 may be stored by the database and accessed from memory by a query optimizer during query plan generation. Statistics 124 help the query optimizer in choosing the right query plan. Missing statistics may prevent the query optimizer from selecting the optimal query plan. An advisor tool may be used to suggest the creation of histograms with distinct value sketches embedded therein when estimates for a particular, critical query have large estimation errors. In the example embodiments, the distinct value sketches may be integrated into the statistics 124 of the histogram data object. An example of HLL sketches as the distinct value sketches are further described herein with respect to FIGS. 3A-3C. Although the examples herein refer to HLL sketches, as noted previously, any distinct value sketch may be used with the example embodiments and these examples should not be construed as limiting the example embodiments.

Figure 2:
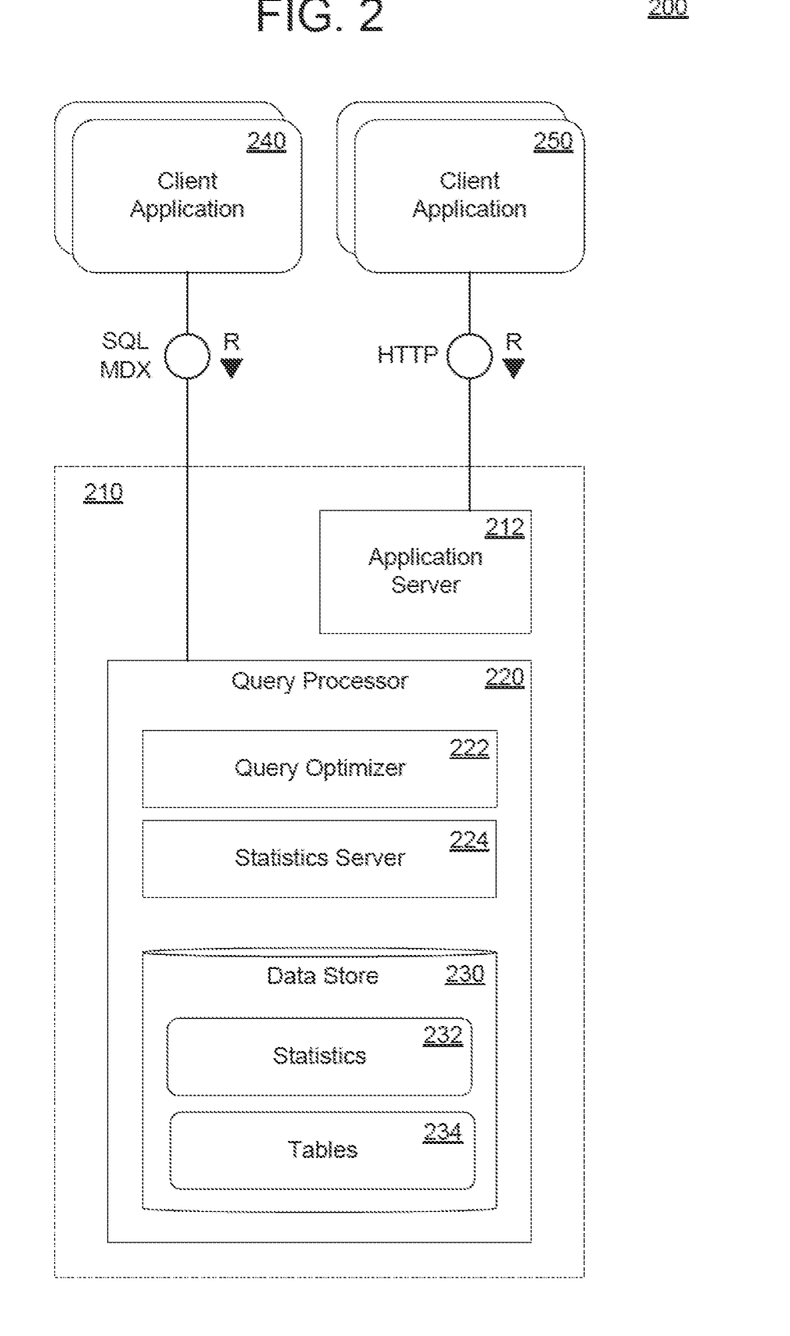
FIG. 2 is a diagram illustrating an example of a database system in accordance with an example embodiment.

FIG. 2 illustrates an example of a database system 200 in which selectivities may be determined according to some embodiments. It should be appreciated that a database architecture of the present application is not limited to the architecture shown in FIG. 2. Referring to FIG. 2, the database system 200 may include a node 210 (e.g., a database node, a server node, a virtual machine, etc.) which may be part of a larger group of nodes. Generally, the node 210 may receive a query (e.g., SQL query, OQL query, XQuery, etc.) from any of client applications 240 and 250 and return results thereto based on data stored within a data store 230 of the node 210. In this example, the node 210 may execute program code to provide an application server 212 and query processor 220. The application server 212 provides services for executing server applications. For example, Web applications executing on an application server may receive Hypertext Transfer Protocol (HTTP) requests from client applications 250 as shown in FIG. 2.

Query processor 220 may include the stored data and engines for processing the data. In this example, query processor 220 is responsible for processing Structured Query Language (SQL) and Multi-Dimensional eXpression (MDX) statements and may receive such statements directly from client applications 240.

Query processor 220 includes a query optimizer 222 for use in determining query execution plans and a statistics server 224 for determining statistics used to estimate query execution plan costs. The statistics server 224 may generate such statistics based on other stored statistics as described herein including histograms with distinct value sketches integrated therein. For example, in response to reception of a query consisting of a conjunct of several predicates on a stored table (or view) of the node 210, the statistics server 224 may estimate selectivity of the query based on known selectivities of various conjuncts of the query predicates.

In some embodiments, underlying database data capable of being queried may be stored in a data store 230 that includes tables 234 such as row-based data, column-based data, and object-based data. Here, the tables 234 may store database content that is accessible to the client applications 240 and 250 In addition, the data store 230 may include statistics 232 such as the histograms/histogram objects described herein which include the distinct value sketches integrated therein. Buckets within the histogram objects may be generated based on rows/columns of data from the tables 234. Furthermore, the data within the tables 234 may be indexed and/or selectively replicated in an index (not shown) to allow fast searching and retrieval thereof. The node 210 may support multi-tenancy to separately support multiple unrelated clients by providing multiple logical database systems which are programmatically isolated from one another.

In some embodiments, the node 210 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

According to various embodiments, when the query processor 220 receives a database query from one of the client applications 240 and 250, the query processor 220 may trigger the query optimizer 222 to generate a query execution plan for the database query. The query optimizer 222 may access one or more histograms (with distinct value sketches embedded therein) from the data store 230 (e.g., statistics 232) to identify statistics of the database associated with the data to be queried. This data can then be used by the query optimizer 222 to generate an accurate query execution plan for the database query. Here, the query optimizer 222 uses the statistics 232 including the histograms described herein to calculate costs of each query. The generated query execution plan can then be executed to carry out the database query on the tables 234 and return the results to the client applications 240 and 250.

The distinct value sketches described herein may provide an estimate of how many of the m buckets of a dataset, with n items in each bucket, contain at least one of k items, out of a total of N=m×n items. An example of the Yao formula is given below:

$$\bar{y}_n^{N,m}(k) = m \times y_n^N(k)$$

where $$y_n^N(k) = \begin{cases} [1-p] & k \leq N-n \\ 1 & k > N-n \end{cases}$$

is the probability of a bucket containing at least one of the k items. p is the probability of a bucket containing none of the items and is defined as $$p = \frac{\binom{N-n}{k}}{\binom{N}{k}}$$

$$= \prod_{i=0}^{k-1} \frac{N-n-i}{N-i}$$

$$= \prod_{i=0}^{n-1} \frac{N-k-i}{N-i}$$

The general problem of the example embodiments is to produce an estimate for the value $$d := |\Pi_{R.B}^D(\sigma_{lb} \leq R.A \leq_{ub}(R))|$$

This problem may also be described as how many distinct projection attribute values are hit, when evaluating a selection predicate on the selection attribute, out of the total number of tuples in the relation. The Yao formula assumes uniform distribution but this might not be the case because the distribution may be highly skewed.

Thus, applying the formula above with the following parameters produces an estimate for d. Each bucket represents one distinct value of the projection attribute, so m is the number of distinct projection attribute values in the relation. N := |R| is the number of tuples in the relation and each bucket contains, assuming uniform distribution of the projection attribute values, n := N/m elements. k := |σ_{lb} ≤ R.A ≤_{ub} (R)| is the number of tuples satisfying the selection predicate.

Additionally, one may rely on the formula to estimate the number of distinct projection attribute values in partially matched buckets, where m is the number of distinct projection attribute values in the partially matched buckets, N is the number of tuples in the partially matched buckets, n:=N/m and k is the number of qualifying tuples in the partially matched buckets. To determine the number of matched tuples k in the partially matched buckets, there are the options of performing selectivity estimation as described above or counting the true number of qualifying tuples.

Figure 3A:
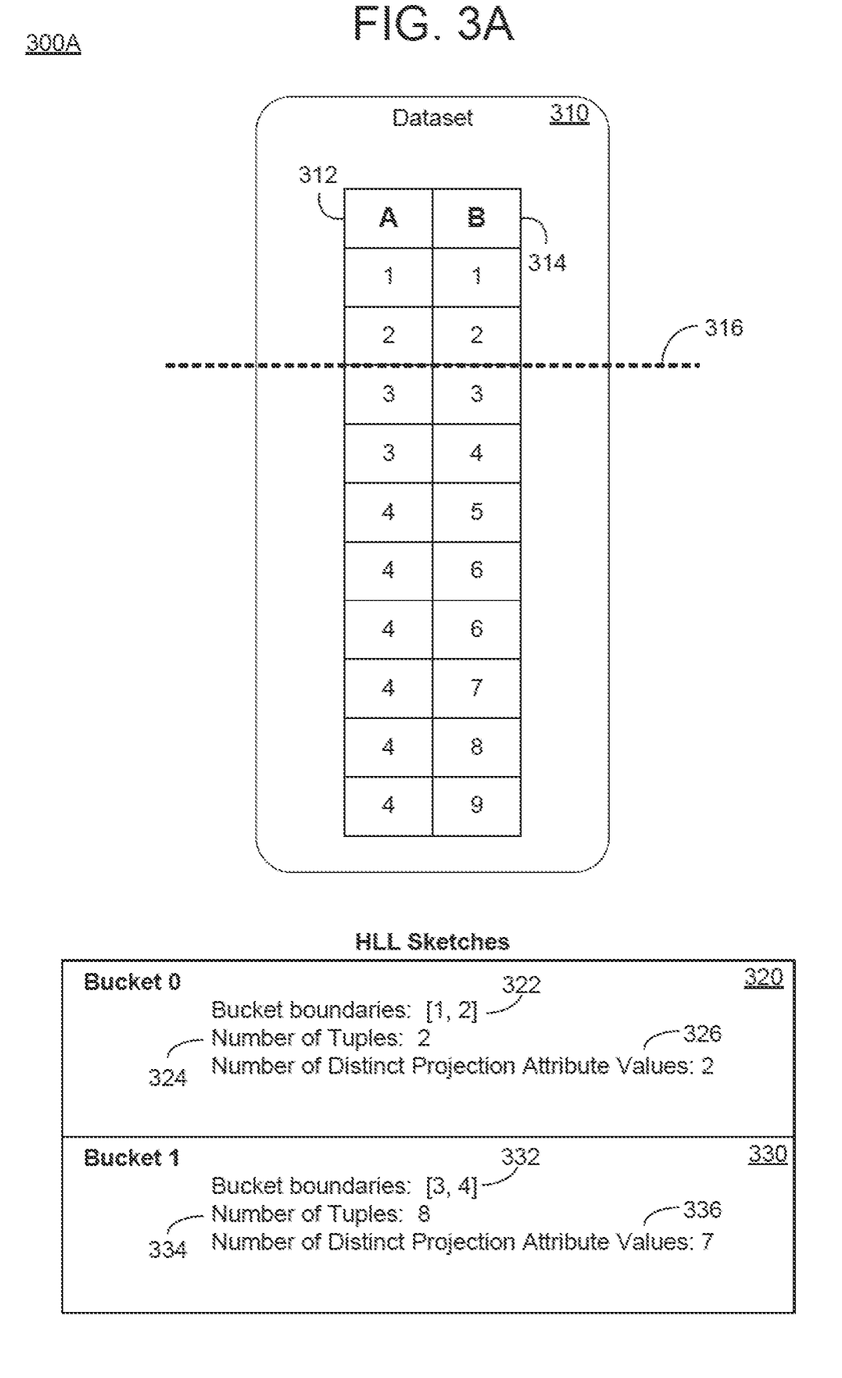
FIGS. 3A-3C are diagrams illustrating examples of a HyperLogLog (HLL) sketch implemented with a histogram, in accordance with various example embodiments.
Figure 3B:
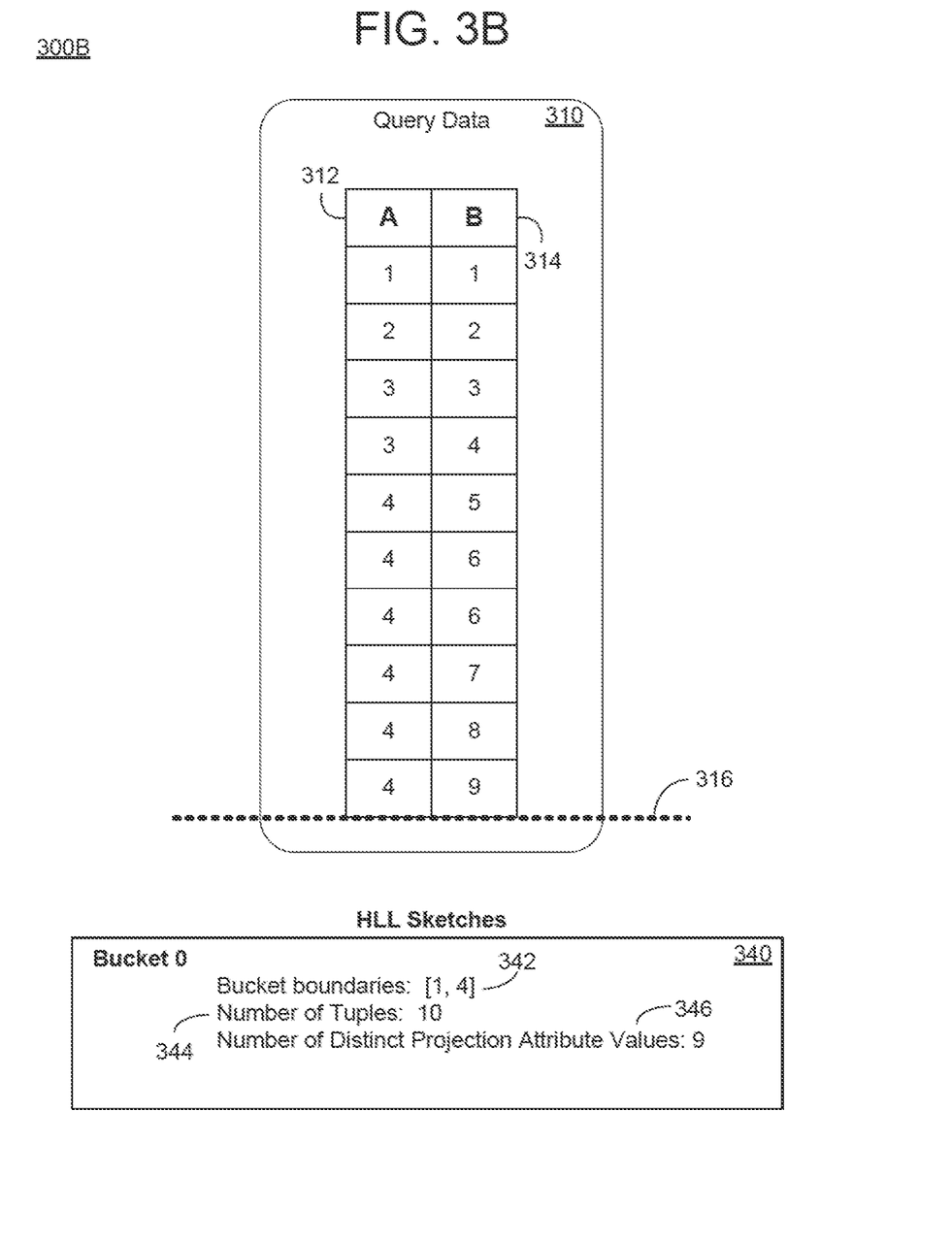
Figure 3C:
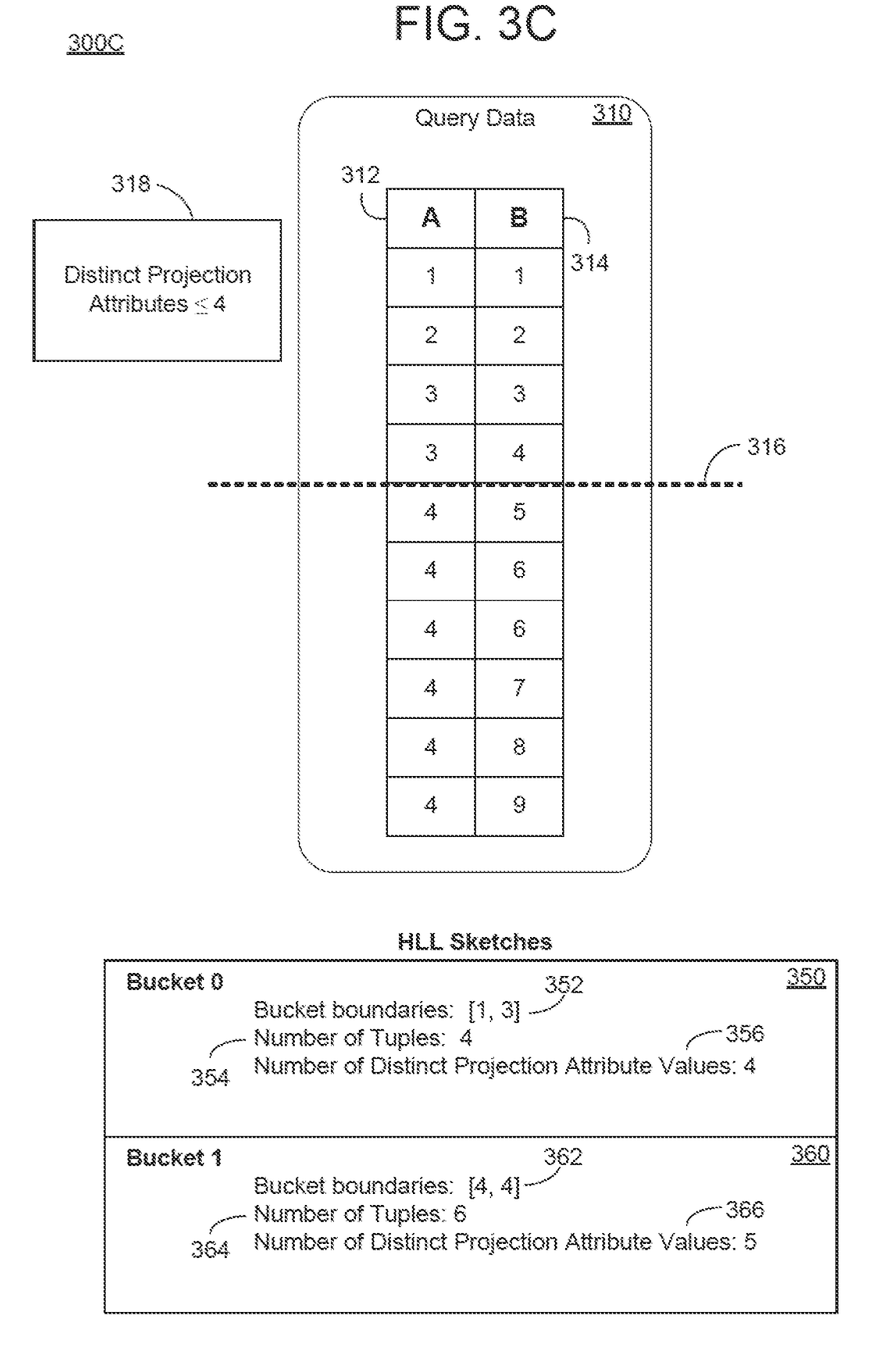

FIGS. 3A-3C illustrate examples of a HyperLogLog (HLL) sketch implemented with a histogram, in accordance with various example embodiments. The database described herein may construct histograms over a domain of a selection attribute, denoted by A in the examples of FIGS. 3A-3C. For each bucket the number of tuples in the bucket and the bucket boundaries are stored. Furthermore the new histograms store the number of distinct values of the projection attribute, denoted by B in the examples of FIGS. 3A-3C, within each bucket using one HLL sketch per bucket.

The histograms provide information on the number of tuples satisfying the selection predicate. Zero or more of the buckets of the histogram can be completely contained in the query range and at most two buckets can be partially matched. The number of tuples in the completely contained buckets can be determined exactly, because it is stored for each bucket. The number of distinct projection attribute values in these buckets is then estimated by merging their HLL sketches and using the improved estimator on the resulting merged HLL sketch. The number of distinct projection attribute values in the partially matched buckets can be determined through the formula described above.

Each of the three histograms in FIGS. 3A-3C use the same implementation of the HLL sketch. However they differ in the way the bucket boundaries are constructed.

FIG. 3A illustrates a histogram 300A which is an equi-width histogram, also referred to as EqW. In this type of histogram, the domain of the selection attribute may be split into equally-sized partitions without overlap. The desired number of buckets for this type may be predetermined, for example, based on a memory budget for the histogram. In this case, the number of buckets provided to the EqW is set to the number of buckets created by the database to make the histograms comparable. The bucket width is calculated as the number of distinct values in the selection attribute value range divided by the number of desired buckets. The bucket width determines how many distinct selection attribute values one bucket contains. Since the bucket width is the same for the entire histogram, each bucket then contains the same number of distinct selection attribute values. Because the distinct values in the projection attribute are likely not evenly distributed, the number of distinct projection attribute values varies for each bucket.

Referring to FIG. 3A, a dataset 310 is shown which includes ten (10) elements/tuples of data for convenience. However, in operation, the number of elements in the dataset 310 may be in the thousands, millions, billions, etc. In this example, a selection attribute 312 is stored in a first column of the dataset 310 and a projection attribute 314 is stored in a second column of the dataset 310. The database, in this example, creates buckets 320 and 330 with an equal width (i.e., the same number of selection attributes in each bucket). A divider 316 illustrates how the equi-width bucketing divides the dataset 310. In this case, each bucket 320 and 330 includes two selection attributes. Thus, a bucket boundary 322 of bucket 320 includes selection attributes 1 and 2 while a bucket boundary 332 of bucket 330 include selection attributes 3 and 4. Furthermore, a total number of tuples 324 in bucket 320 is 2 while a total number of tuples 334 in bucket 330 is eight (8).

An HLL algorithm may be used to estimate the number of distinct values in each bucket. In this case, a distinct value attribute 326 may store an estimated number of distinct values of the bucket 320 (which in this case is 2). Likewise, a distinct value attribute 336 may store an estimated number of distinct values of the bucket 330. Here, the attributes (e.g., 322, 324, and 326 may be stored in fields of an HLL sketch as shown at the bottom of the figure in FIG. 3A. The sketches are not limited to these specific attributes, and it should be appreciated that other additional attributes may be included.

FIG. 3B illustrates an example of a histogram 300B which attempts to achieve an equal number of distinct projection attribute values in each bucket. Here, a user may input a parameter 318 (e.g., θ) via a user interface which specifies a desired number of projection attribute values in each bucket, where 0<θ. The parameter may be input via a user interface such as a configuration settings, or the like. Here, the parameter identifies a desired number of four (4) or less distinct selection attribute values in each bucket.

Referring to FIG. 3B, the bucket boundaries are determined by trying to achieve an equal number of distinct projection attribute values in each bucket. Here, the histogram 300B is also created from the dataset 310 as is used in FIG. 3A, however, in this case, the bucket boundaries (i.e., the number of selection attributes in each bucket) are determined by adding the values of the selection attribute to a bucket as long as the HLL sketch estimate for the bucket is ≤θ. This essentially creates an equi-depth histogram for the distinct values of the projection attribute instead of the usual frequencies of the selection attribute. Areas with many distinct projection attribute values have a higher bucket density than areas with fewer. Therefore the histogram can adapt to a skewed data distribution. The created buckets vary in width, since a selection attribute value may correspond to one or more distinct projection attribute values and, thus, different selection attribute values result in the bucket reaching θ distinct projection attribute values at varying speed.

Further the bucket boundaries in the histogram 300B are not overlapping, meaning that if a selection attribute value is added to the bucket, all distinct projection attribute values associated with this selection attribute value are added to that bucket as well. This however can result in buckets with more than 2θ distinct projection attribute values, if a selection attribute corresponding to more than θ0 distinct projection attribute values is added to an existing bucket with θ distinct projection attribute values, as shown in FIG. 3B.

The input parameter in FIG. 3B is 4 (i.e., θ=4) for bucket construction. To create the HLL sketch, the database adds the selection attribute (value=1) to the first bucket. Here, the number of distinct projection attribute values is 1≤θ. So the selection attribute value 2 is added to the bucket. After which, the number of distinct projection attribute values then is 2 which is still less than θ. Next the selection attribute value 3 is added to the bucket and the new number of distinct projection attribute values is 4 which is still equal to θ. That is, after the projection attribute value of 3 and the corresponding distinct selection attributes are added to the bucket 340, the total number of distinct projection values is lower than the input parameter.

In this case, since the bucket is not filled yet (i.e., the number of distinct projection values is still equal to or less than the threshold), the final selection attribute value 4 is also added to the first bucket, leading to a bucket with more than 2θ distinct projection attribute values. The resulting histograms then consists of the bucket 340 which includes bucket boundaries 342 including selection attributes 1-4, number of tuples attribute 344 which is 10, and a number of distinct values attribute 346 which is 9. As shown above, the divider 316 is set at the bottom of the dataset 310 indicating all of the elements in the list are included in the bucket. The result of the histogram 300B is that the distinct projection attribute values are unevenly distributed within the bucket with the majority belonging to selection attribute value 4.

FIG. 3C illustrates an example of a histogram 300C in which distinct attribute values are used to create the buckets. Similar to FIG. 3B, in this example, the buckets are also created by adding selection values when the number of distinct projection attribute values estimated by the HLL sketch is ≤θ. However, in this example, an additional limitation is placed on the total number of distinct projection values that can be included in a bucket. In particular, the total number of distinct projection values cannot exceed 2θ. It should also be appreciated that this threshold can be set to whatever desired threshold is needed. In response, the database may create bucket boundaries that provide approximately the same number of distinct values in each bucket.

Referring to FIG. 3C, the selection attribute values 1-3 are added to a bucket 350 in the same way as for the example in FIG. 3B. However after adding the selection attribute value 4, the bucket contains 9 distinct projection attribute values, which is more than 2θ. So the selection attribute value 4, which was added last, is put into a separate bucket, leaving the first bucket as it was before this value was added. The histogram 300C includes bucket 350 having a bucket boundary attribute 352, a number of tuples value 354, and a number of distinct values attribute 356, and a bucket 360 having a bucket boundary attribute 362, a number of tuples value 364, and a number of distinct values attribute 366.

Accordingly, the first three selection attributes (1-3) and the corresponding distinct value attributes are added to a bucket 350. In this case though, when selection attribute 4 is added to the bucket 350, the total number of distinct values goes from 4 to 9, which is greater than the threshold 2θ. Thus the bucket 360 is created for the selection attribute 4. As a result, the total number of distinct values in each bucket 350 and 360 is more evenly split.

While there is only one condition determining the bucket boundaries for the histograms 300A and 300B, when the bucket width is reached or the number of distinct projection attribute values >θ respectively, the database can create four different bucket types for the histogram 300C based on different conditions as further explained below.

Bucket Type 1

For the estimate of the number of distinct projection attribute values in buckets of Type 1 it always holds that $\theta < \hat{h} \leq 2\theta$ where $\hat{h}$ represents the estimated number of distinct projection attributes in a bucket.

Bucket Type 2

For the estimate of the number of distinct projection attribute values in buckets of Type 2 it always holds that $1 \leq \hat{h} \leq \theta$ where $\hat{h}$ represents the estimated number of distinct projection attributes in a bucket.

Bucket Type 3

For the estimate of the number of distinct projection attribute values in buckets of Type 3 it always holds that $\hat{h} > \theta$ where $\hat{h}$ represents the estimated number of distinct projection attributes in a bucket.

Bucket Type 4

For the estimate of the number of distinct projection attribute values in buckets of Type 4 it always holds that $1 \leq \hat{h} \leq \theta$ where $\hat{h}$ represents the estimated number of distinct projection attributes in a bucket.

Figure 4:
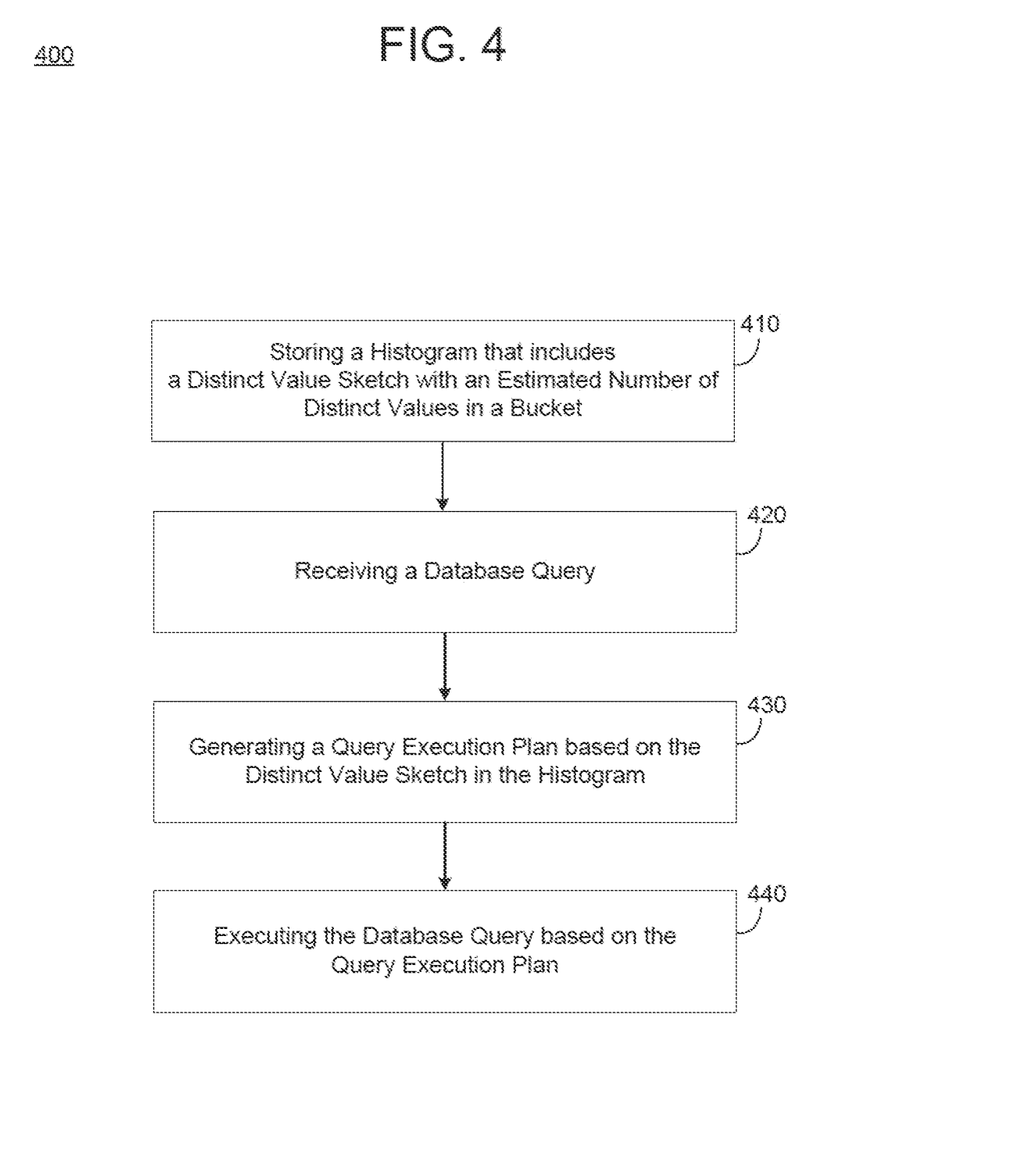
FIG. 4 is a diagram illustrating a method of executing a database query based on a histogram that includes a distinct value sketch, in accordance with an example embodiment.

FIG. 4 illustrates a method 400 of generating semantic bytecode in accordance with an example embodiment. As an example, the method 400 may be performed by a database node included within a distributed database system. As another example, the method 400 may be performed by a computing device such as a server, a cloud platform, a user device, an on-premises server, and the like. In some examples, the method 400 may be performed by a plurality of devices in combination. Referring to FIG. 4, in 410, the method may include storing a histogram that comprises a representation of a bucket of data from a database and that includes a distinct value sketch with a distinct value attribute that identifies an estimated number of distinct values within the bucket of data. In some embodiments, the method may also include creating the histogram in response to a request, periodically, or the like.

In 420, the method may include receiving a database query, for example, an SQL query or other query with a Group By statement specifying a group of data to be queried. In 430, the method may include generating a query execution plan for the database query based on the distinct value attribute of the bucket within the distinct value sketch embedded within the histogram. For example, the method may perform cost estimation for different query paths based on statistics of the data including the histogram that includes the distinct value sketch. In 440, the method may include executing the database query on the bucket of data from the database based on the generated query execution plan.

In some embodiments, the method may further include generating the histogram such that the histogram comprises a plurality of buckets of data and a plurality of distinct value sketches, where each bucket has its own respective distinct value sketch having a respective distinct value attribute stored therein. In some embodiments, the generating may include generating the query execution plan for the database query based respective distinct value attributes of a plurality of distinct value sketches for the plurality of buckets of data. In some embodiments, a bucket of data represents a range of values on an X axis of the visual representation of the histogram, and the distinct value sketch includes an aggregated distinct value attribute generated by combining distinct value from one or more columns corresponding to the range of values.

In some embodiments, the method may further include receiving, via a user interface, an integer value identifying a number of columns of data to be included in each bucket, and dynamically generating the histogram with a dynamic number of buckets based on the integer value input via the user interface. In some embodiments, the method may further include generating, for each respective bucket among the dynamic number of buckets, an distinct value sketch with a distinct value attribute of the respective bucket. In some embodiments, the distinct value sketch may further include a total attribute value that identifies a total number of data rows included in the bucket of data. In some embodiments, the method may further include embedding the distinct value sketch within a histogram object that includes a graphic representation of the bucket of data.

Figure 5:
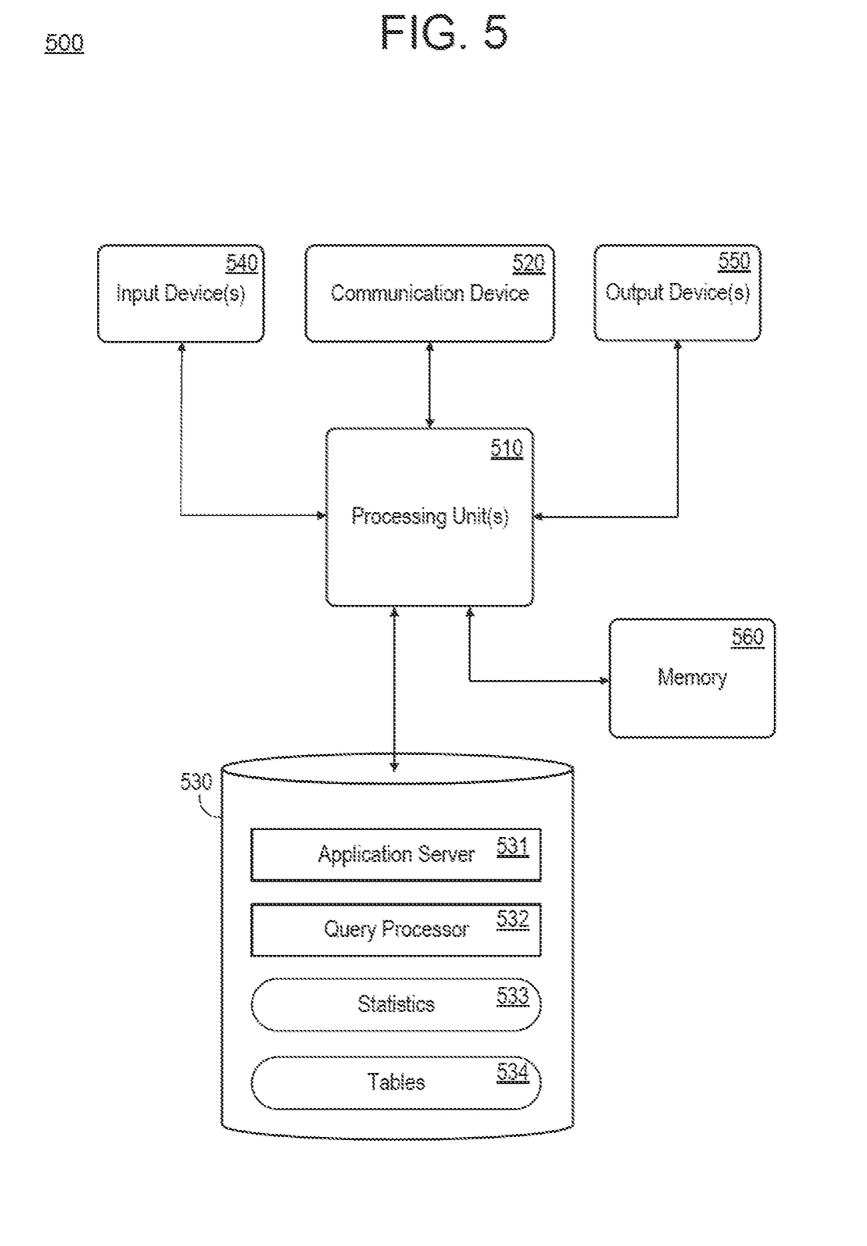
FIG. 5 is a diagram illustrating a computing system, in accordance with an example embodiment.

FIG. 5 is a diagram of a server node 500 according to some embodiments. The server node 500 may include a general-purpose computing apparatus and may execute program code to perform any of the functions described herein. The server node 500 may comprise an implementation of the node 210 shown in FIG. 2, in some embodiments. It should also be appreciated that the server node 500 may include other unshown elements according to some embodiments and may not include all of the elements shown in FIG. 5.

Server node 500 includes processing unit(s) 510 (i.e., processors) operatively coupled to communication device 520, data storage device 530, input device(s) 540, output device(s) 550, and memory 560. Communication device 520 may facilitate communication with external devices, such as an external network or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into the server node 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Application server 531 and query processor 532 may each comprise program code executed by processing unit(s) 510 to cause server node 500 to perform any one or more of the processes described herein. Such processes may include estimating selectivities of queries on tables 534 based on statistics 533. Embodiments are not limited to execution of these processes by a single computing device. Data storage device 530 may also store data and other program code for providing additional functionality and/or which are necessary for operation of server node 500, such as device drivers, operating system files, etc As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store a data set; and
a processor configured to
execute, via a database, a HyperLogLog (HLL) sketch algorithm on the data set which hashes data values in the data set and estimates distinct values in the data set based on hashed data values,
dynamically divide the data set into a plurality of buckets that have different size widths based on a skewed density of the estimated distinct values within the data set and a predefined threshold of distinct values allowed per bucket,
generate a histogram that includes a distinct value sketch with identifiers of the plurality of buckets, the different size widths, and an estimated number of distinct values for each of the plurality of buckets embedded therein, respectively, receive a database query request, estimate processing times for a database query corresponding to the database query request based on an estimated number of distinct values of a bucket among the plurality of buckets within the histogram and generate a query execution plan for the database query based on the estimated processing times, and execute the database query on data from the database based on the generated query execution plan.

2. The computing system of claim 1, wherein each bucket comprises its own respective distinct value sketch within the histogram including a respective distinct value attribute stored therein.

3. The computing system of claim 2, wherein the processor is configured to generate the query execution plan for the database query based on distinct value attributes of a plurality of distinct value sketches for the plurality of buckets.

4. The computing system of claim 1, wherein each bucket among the plurality of buckets represents a range of values on an X axis of a representation of the histogram, and the distinct value sketch includes an aggregated distinct value attribute generated by combining distinct values from a range of rows corresponding to the range of values.

5. The computing system of claim 1, wherein the processor is further configured to dynamically determine the plurality of different widths of the plurality of buckets such that each bucket has a number of distinct values that is equal to or less than the predefined threshold.

6. The computing system of claim 1, wherein the processor is further configured to generate, for each respective bucket among the dynamic number of buckets, a distinct value sketch with a distinct value attribute of the respective bucket stored therein.

7. The computing system of claim 1, wherein the processor is further configured to store a total attribute value that identifies a total number of data rows included in a bucket of data within the distinct value sketch in the histogram.

8. The computing system of claim 1, wherein the processor is configured to embed the estimated number of distinct values for each of the plurality of buckets within a histogram object that includes a graphic representation of the plurality of buckets.

9. A method comprising:

storing a data set;

executing, via a database, a HyperLogLog (HLL) sketch algorithm on the data set which hashes data values in the data set and estimates a number of distinct values in the data set based on the hashed data values;

dynamically dividing the data set into a plurality of buckets that have different size widths based on a skewed density of the estimated distinct values within the data set and a predefined threshold of distinct values allowed per bucket;

generating a histogram that includes a distinct value sketch with identifiers of the plurality of buckets, the different size widths, and identifiers of an estimated number of distinct values for each of the plurality of buckets embedded therein, respectively;

receiving a database query request;

estimating processing times for a database query corresponding to the database query based on an estimated number of distinct values of a bucket among the plurality of buckets within the histogram and generating a query execution plan for the database query based on the estimated processing times; and executing the database query on data from the database based on the generated query execution plan.

10. The method of claim 9, wherein each bucket comprises its own respective distinct value sketch within the histogram including a respective distinct value attribute stored therein.

11. The method of claim 10, wherein the generating comprises generating the query execution plan for the database query based on distinct value attributes of a plurality of distinct value sketches for the plurality of buckets.

12. The method of claim 9, wherein each bucket among the plurality of buckets represents a range of values on an X axis of a representation of the histogram, and the distinct value sketch includes an aggregated distinct value attribute generate by combining distinct values from a range of rows corresponding to the range of values.

13. The method of claim 9, further comprising dynamically determining the plurality of different widths of the plurality of buckets such that each bucket has a number of distinct values that is equal to or less than the predefined threshold.

14. The method of claim 9, further comprising generating, for each respective bucket among the dynamic number of buckets, a distinct value sketch with a distinct value attribute of the respective bucket stored therein.

15. The method of claim 9, wherein the method further comprises storing a total attribute value that identifies a total number of data rows included in a bucket within the distinct value sketch in the histogram.

16. The method of claim 9, wherein the method further comprises embedding the estimated number of distinct values for each of the plurality of buckets within a histogram object that includes a graphic representation of the plurality of buckets.

17. A method comprising:

retrieving a data set comprising a plurality of rows and columns from a database;

executing, via the database, a HyperLogLog (HLL) sketch algorithm on the data set which hashes data values in the data set and estimates of a number of distinct values in the data set based on the hashed data values;

dynamically dividing the data set into a plurality of buckets that have different size widths based on a skewed density of the estimated distinct values within the data set and a predefined threshold of distinct values allowed per bucket;

generating a histogram object that includes a distinct value sketch with identifiers of the plurality of buckets, the different size widths, and an estimated number of distinct values for each of the plurality of buckets embedded therein, respectively; and storing the histogram in the database.

18. The method of claim 17, wherein the dynamically dividing comprises dividing the dataset into the plurality of buckets via execution of the HLL sketch algorithm on the data set.

19. The method of claim 17, wherein the generating further comprises generating a graphic representation of the plurality of buckets and storing the graphic representation within the histogram.

20. The method of claim 17, wherein the method further comprises generating a query execution plan based on the histogram and executing a database query against the database based on the generated query execution plan.

* * * * *